United States Patent [19]

Thomas et al.

[11] 4,181,924

[45] Jan. 1, 1980

[54] MATING CIRCUIT BREAKERS WITH BUS CLIP RECEIVING ZONE AND COMMUNICATING ARCUATE GROOVE

[75] Inventors: Robert W. Thomas, Earlysville; Steven F. Hovanic, Barboursville, both of Va.

[73] Assignee: Arrow-Hart, Inc., Earlysville, Va.

[21] Appl. No.: 913,387

[22] Filed: Jun. 7, 1978

[51] Int. Cl.² .............................................. H02B 1/04
[52] U.S. Cl. .................................... 361/353; 200/293; 200/294
[58] Field of Search ............... 200/50 C, 293, 294, 200/307; 361/353, 354, 355, 346, 363, 376

[56] References Cited

U.S. PATENT DOCUMENTS

| | | | |
|---|---|---|---|
| 3,054,025 | 9/1962 | Edmunds | 361/354 |
| 3,198,992 | 8/1965 | Norden | 361/353 |
| 3,200,228 | 8/1965 | Locher | 200/294 |
| 3,333,157 | 7/1967 | Stokes | 200/294 |
| 3,354,284 | 11/1967 | Knecht | 200/293 |
| 3,389,307 | 6/1968 | Locher et al. | 361/353 |
| 3,403,299 | 9/1968 | Mrowka et al. | 361/353 |

*Primary Examiner*—Gerald P. Tolin
*Attorney, Agent, or Firm*—Hopgood, Calimafde, Kalil, Blaustein & Lieberman

[57] ABSTRACT

A circuit breaker includes a recessed zone in the breaker housing for accommodating the bus clip of a mating circuit breaker when the breakers are mounted adjacent one to another on a panelboard. An arcuate groove of varying depths formed in the breaker housing communicates at its lower end with the recessed zone to permit the bus clip of the mating breaker to be moved from the recessed zone and along the arcuate groove, such that the mating breaker can be readily removed from, or installed into, the panelboard.

5 Claims, 10 Drawing Figures

MATING CIRCUIT BREAKERS WITH BUS CLIP RECEIVING ZONE AND COMMUNICATING ARCUATE GROOVE

The present invention relates generally to circuit breakers, and more particularly to half-size circuit breakers designed for arrangement in a panelboard.

In a standard load center or panelboard, in which two line or power buses are employed, the panelboard includes contact blades or stabs that project upward from the base of the panelboard in a parallel arrangement. The blades are electrically connected such that any two adjacent blades are connected to different polarity buses. In a typical arrangement, the bus blades are spaced one inch apart and the electrical circuit breakers mounted on the panelboard are also one inch in width, such that one breaker is provided per bus blade.

In recent years, breakers have been manufactured and sold that have housings that are only one-half inch wide. In the use of these breakers, which are commonly referred to as half-size breakers in the standard panelboard, a pair of breakers are inserted into each one-inch slot, thereby effectively doubling the number of circuits that can be connected through a single circuit breaker panel and increasing the flexibility of use of the panel.

As shown, for example, in U.S. Pat. No. 3,389,307, half-size breakers are conventionally releasably connected to the bus blades on the panelboard by means of U-shaped contacts or bus clips that extend from the interior of the breaker housing and resiliently snap over the bus blades to make electrical contact with the bus blades and provide retention of the breaker on the panelboard.

Since the bus clips extend beyond the molded housing of the breaker, it has been proposed, as shown in said patent, to provide a recessed zone in the portion of the breaker housing from which the clip extends and to laterally space the clips in mating half-size breakers, so that when two half-size breakers are mounted adjacent one another on a common bus blade, the bus clips on the two breakers are respectively received and accommodated within the recessed zones in the other of the mating breakers. By this arrangement, two breakers can be readily accommodated within the one-inch slot between the bus blades in a conventional full-sized panelboard.

Circuit breakers are commonly installed on a panelboard by inserting a slot formed in the opposite end of the breaker into a tab on the panelboard, and then pivoting the breaker downward until the bus clip is snapped over the bus blade. However, even in mating breakers provided with clip-accommodating recessed zones, the pivoting insertion of a breaker is often interfered with by the housing of a mating adjacent circuit breaker that is already mounted on the panel board. This interference to the installation of the breaker continues until the clip on the breaker being inserted is received within the clip-accommodating recessed zone of the lower portion of the adjacent, mating circuit breaker.

Moreover, one two half-sized breakers are mounted on a common bus blade in an adjacent, side-by-side relationship, it is not possible readily to remove one of the breakers without also removing the other breaker, because of the similar interference offered to the bus clip on the breaker being removed by the housing of the other mating breaker. As a result of this inteference between the clip of one breaker and the housing of an adjacently mounted mating breaker, it is generally difficult to install or remove a breaker from the panelboard, particularly when, as is common, the panelboard is located in an inaccessible location.

It is thus an object of the present invention to provide a circuit breaker which can be more readily installed and removed from a panelboard.

It is a further object of the present invention to provide an improved half-sized breaker which facilitates the use of such breakers in conventional full-sized panelboards.

It is another object of the invention to provide a circuit breaker of the type described, which facilitates the mounting of two breakers in a side-by-side relationship on a panelboard.

The present invention is directed to a circuit breaker having a recessed zone in a corner of the housing from which a bus clip extends to accommodate the bus clip of a mating breaker when the two breakers are arranged in a side-by-side manner on the panelboard. The other breaker also has a corner recessed zone for accommodating the clip of the other breaker, which is laterally offset from the clip on the mating breaker, so as to permit both clips to be respectively received within the recessed zones of the other breakers when the two breakers are adjacently mounted in a panelboard.

In accordance with the invention, the breaker further includes a recessed arcuate groove formed in the side wall of the breaker housing. This groove has a lower end communicating with the recessed zone and extends along an arcuate path toward the upper end of the housing. By the provision of this arcuate groove in the breaker housing, as one of the mating breakers is pivoted with respect to the other, either to remove or insert the breaker from or into the panelboard, the bus clip on the breaker being installed or removed rides along the arcuate groove in the adjacent breaker, which remains mounted on the panelboard, whereby the insertion or removal of the breaker can be achieved without interference from the adjacent stationary breaker and without the need to remove the other breaker from the panelboard.

The arcuate groove, in an embodiment of the invention herein described, has three separate segments; a lower part of a substantially constant depth and at the same depth as the corner recessed clip-accommodating zone; an upper part of a reduced depth and a slight taper terminating at the surface of the breaker housing; and a third, intermediate, tapering part that communicates at its lower end with the first part of the groove, and at its upper end with the upper, shallow part of the groove.

One of the half-size breakers in each pair of mating breakers may further include a rejection tab that projects outwardly from the outer edge of the breaker housing at the recessed zone and spaced from the bus clip. The rejection tab prevents the mounting of the breaker onto a bus blade that does not have an appropriately shaped notch formed therein, so that the total number of breakers permitted on the bus (on in the panelboard) is not exceeded. In another aspect of this invention, the mating circuit breaker has a second arcuate groove in the same wall of the housing as the first-mentioned groove for accommodating the rejection tab when the breaker that includes the tab is pivoted relative to its mating breaker when the former is being inserted onto or removed from the panelboard.

To the accomplishment of the above and to such further objects as may hereinafter appear, the present invention relates to a circuit breaker substantially as defined in the appended claims and as described in the following detailed specification of one embodiment thereof, as considered together with the accompanying drawings, in which:

Figure 3:
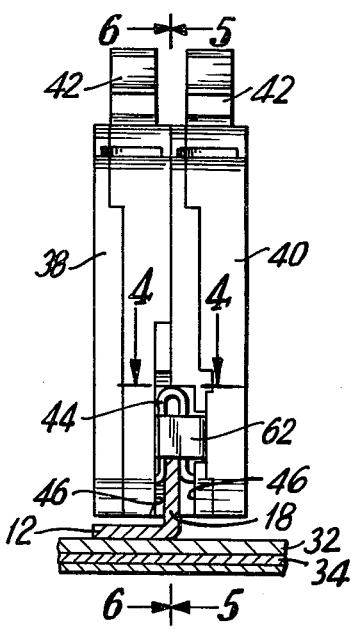
FIG. 3 is a partial sectional view taken along the line 3—3 of FIG. 2.
Figures 5, 5A, 5B:
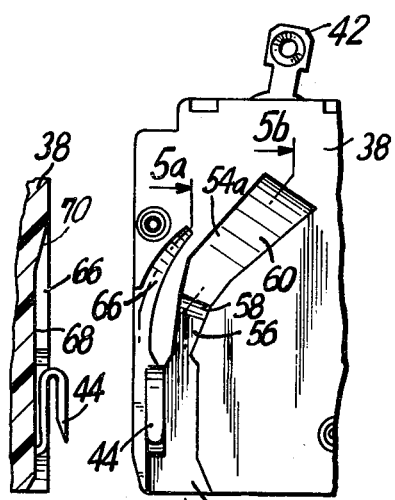
FIG. 5 is a fragmentary side elevation of a circuit breaker as viewed in the direction of lines 5—5 of FIG. 4.
Figures 6, 6A:
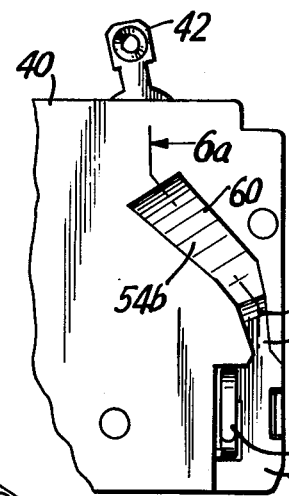
Figure 7:
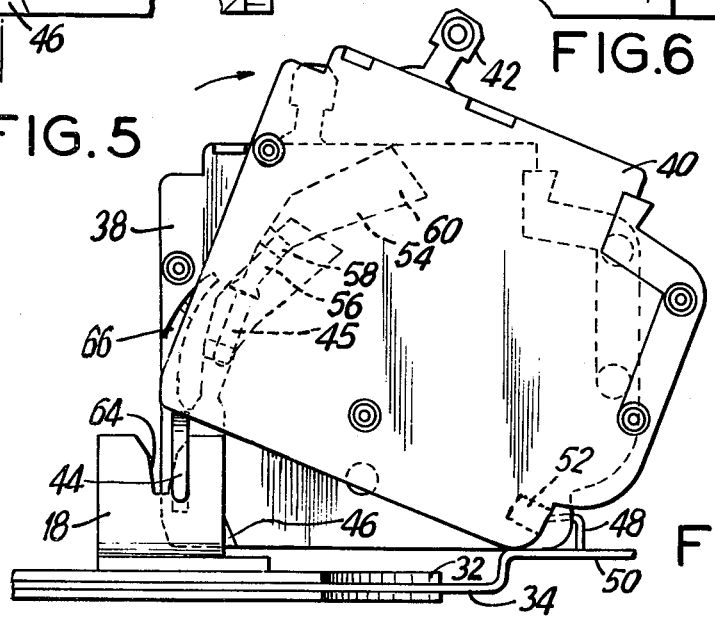

FIGS. 5a and 5b are fragmentary sectional views respectively taken along the sectional lines 5a—5a and 5b—5b in FIG. 5;

FIG. 6 is a fragmentary side elevation of a circuit breaker that mates with the breaker of FIG. 5 as viewed along the line 6—6 in FIG. 3;

FIG. 6a is a fragmentary sectional view taken along the section line 6a—6a of FIG. 6; and FIG. 7 is a side elevation illustrating a circuit breaker being removed.

Figures 1, 2:
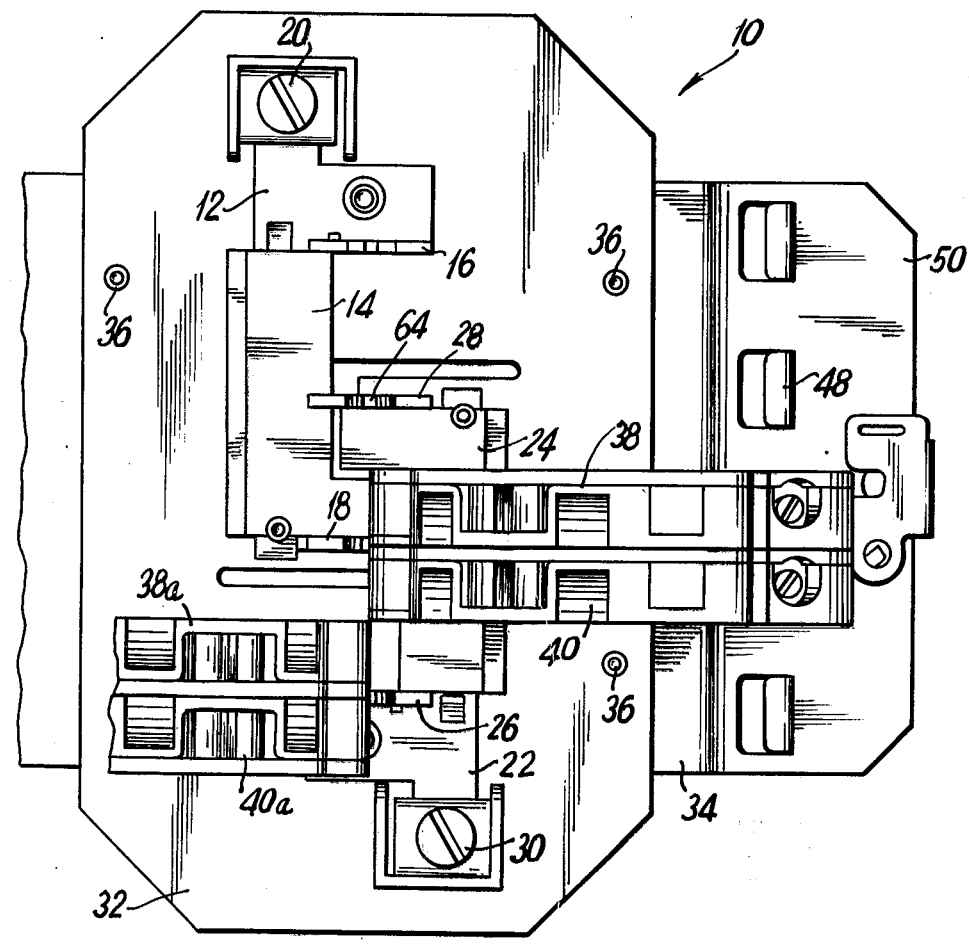
FIG. 1 is a plan view of a panelboard with several circuit breakers of the invention mounted thereon.
FIG. 2 is a side elevation of a circuit breaker mounted on the panelboard of FIG. 1.

The present invention is directed to an improved circuit breaker adapted for use with a panelboard of the type shown best in FIG. 1. As therein shown, the panelboard 10 includes a bus 12 partly covered by a plastic molding 14. A group of upstanding bus blades 16 and 18 project upwardly from bus 12 and a lug 20 is mounted on bus 12 for receiving a cable (not shown).

The panelboard also includes a second bus 22 partly covered by a plastic molding 24 and upstanding bus blades 26 and 28 projecting therefrom. A lug 30 is mounted on bus 22 for receiving a second cable (also not shown).

The plastic moldings 14 and 24 and buses 12 and 22 are supported on, and fastened to, an insulating sheet 32, which is secured to a metal plate 34 such as by means of rivets 36. The construction of the panelboard is conventional and is similar to that shown in U.S. Pat. No. 3,389,307.

The circuit breaker of the invention is herein shown in the form of a half-size breaker adapted to be mounted on the bus blades of the panelboard and is particularly adapted for being mounted on a common bus blade with a mating half-size circuit breaker in a side-by-side relationship. A pair of mounted mating half-size breakers is shown in FIGS. 1 and 3 in which circuit breakers 38 and 40 are mounted on a common bus blade 18, and located at either side of this blade. As viewed in FIG. 3, breaker 38 may be designated as a left-hand model and breaker 40 may be designated as a right-hand model and, together, these breakers constitute a mating circuit breaker pair. An additional circuit breaker pair consisting of breakers 38a and 40a is shown in FIG. 1 as being mounted on bus blade 26

The left-hand and right-hand circuit breakers 38 and 40 each include a plastic molded housing which is preferably formed of two molded units fastened to one another by suitable means such as rivets. The molded units define an interior space which contains the breaker mechanism. That mechanism is conventional and is not further described herein.

Figure 4:
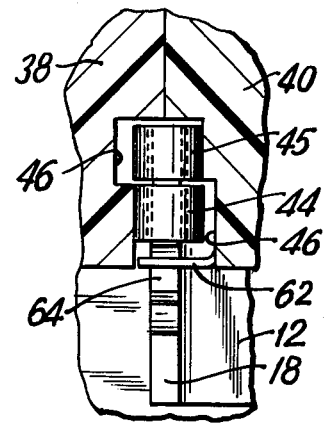
FIG. 4 is a fragmentary sectional view taken along the line 4—4 in FIG. 3.

The breakers each include a manual actuating lever 42 which projects from the top of the breaker housing for opening and closing the switching mechanism within the breaker housing. The breakers in each pair of mating breakers 38 and 40 are mounted on the appropriate bus blade by means of U-shaped bus clips 44 and 45 which respectively fit over and are retained to the bus blade as shown best in FIGS. 3 and 4. The bus clips 44 and 45 extend from the interior of the breaker housing and, when the breakers are mounted on a bus blade, are accommodated with a recessed zone 46 formed in the side of the mating breaker housing at a corner of the housing. In each pair of mating breakers, such as breakers 38 and 40, the recessed zones 46 are formed on opposite sides of the breaker housings such that when the breakers are mounted on adjacent sides of a common bus blade, as shown in FIG. 3, the respective recessed zones and the clips are in a confronting relationship.

Moreover, as shown in FIGS. 5 and 6, the clip 44 in the left-hand breaker 38 (FIG. 5) is located outboard of the recessed zone 46 near the front of the breaker housing, whereas in the right-hand breaker 40 (FIG. 6), the bus clip 45 is located inboard of the recessed zone 46 and from the front of the housing. In this manner, when the mating breakers are mounted, as shown in FIG. 3, in a side-by-side relationship on either side of a common bus blade, the clip of each breaker 38, 40 is accommodated within the recessed zone 46 of the other breaker, as shown best in FIG. 4.

As is conventional, the panelboard may include means for additionally retaining the circuit breakers at a location spaced from the bus blades. In the embodiment shown, this is achieved by a plurality of tabs 48 in the panelboard, which are formed out of a side section 50 that extends from plate 34. As shown in FIG. 2, tab 48 is received within horizontal slot 52 formed in the wall of the breaker housing opposite to the end of the breaker in which the bus clip is located. Each of the tabs 48 may be of a sufficient width to accommodate the slots 52 of two adjacent mating circuit breakers.

As illustrated in FIG. 7, a breaker is installed onto the panelboard by first positioning the breaker such that the slot 52 in the breaker is fitted over the tab 48. Thereafter, the breaker is pivoted downward until the bus clip snaps over the bus blade. To remove a breaker from the panelboard, this procedure is reversed in that the breaker is pivoted upward with the tab 48 serving as a pivot to remove the clip from the bus blade, after which the breaker is slid away from the tab to completely free the breaker from the panelboard.

In a conventional arrangement of half-size mating breakers it is difficult to insert or remove a breaker from the panelboard, since after the clip of one breaker is pivoted away from the recessed zone of the adjacent mating breaker it contacts the side wall of the adjacent breaker, and its continuing pivotal motion either onto or away from the bus blade is interfered with. Thus, removal and insertion of these breakers is a difficult operation particularly when, as is common, the panelboard is in an inaccessible location. As a result, it is usually required to remove both breakers in a pair of adjacent breakers even though it is only desired to remove or install one of the breakers from or onto the panelboard.

To overcome this deficiency in conventional circuit breakers, and particularly in half-size circuit breakers in which the problem is more serious, the circuit breaker of the present invention further includes an arcuate groove 54 formed in the same side wall of the breaker housing in which the recessed zone is formed. As shown most clearly in FIGS. 5 and 6, which show arcuate grooves 54a and 54b for mating breakers, the arcuate groove 54 communicates at its lower end with the upper end of the recessed zone 46 and is in substantial registry with, although disposed at a slight angle to, that portion of the recessed zone that accommodates the bus clip of the mating breaker when the latter is arranged on a common bus clip, as in FIG. 3.

As seen in FIGS. 5b and 6a, the lower part 56 of the groove is at the same depth as the recessed zone. The groove 54 also includes a second part 58 which extends from the lower part 56 and has a relatively sharp taper and terminates at a relatively shallow depth in the housing at its upper end. The latter, in turn, communicates with a third, shallow and wider part 60 that extends at an angle away from the second part and terminates short of the upper end of the breaker housing. Thus, the groove 54, as viewed in its entirety, extends from the recessed zone along a path of decreasing depth and increasing width and describes an essentially arcuate path away from the recessed zone.

The utility of this groove and the advantages derived from its incorporation in the breaker housing are best illustrated in FIG. 7, which shows one of the breakers 40 being removed from the panelboard by being pivoted with respect to the mating, stationary breaker 38 about its tab-retention end in the direction of the arrow, while the mating breaker 38 remains mounted on the panelboard. As therein shown, the bus clip from breaker 40 moves out the recessed zone 46 in breaker 38 and enters into the lower part 56 of the groove 54 in breaker 38 and then into the sloping middle part 58 of that groove. Part 58 acts as a camming surface that facilitates the further upward pivoting movement of the bus clip on breaker 40 along the adjacent side wall of breaker 38. Still further pivotal upward movement of the breaker 40 in the direction of the arrow causes the clip on breaker 40 to pass into the upper, slightly taperd part 60 of the arcuate groove 54 in breaker 38. At this point, breaker 40 can be readily removed from the panelboard without the need for removing or otherwise disturbing breaker 38. It will be understood that the arcuate groove 54 in one of the mating breakers 38 and 40 also substantially facilitates the insertion of the other mating breaker, which is achieved by pivoting the breaker in the opposite or downward direction as viewed in FIG. 7. In this instance, the bus clip on the breaker being inserted as initially received in the upper, shallow part 60 of the groove 54 and proceeds to pass through the middle, sloping part 58 and into the deep lower part 56 from which it passes into the recessed zone of the mating breaker already mounted on the panelboard.

As shown in FIG. 3, one of the breakers in the breaker pair (here the right-hand breaker 40) is provided with a rejection tab 62 carried on the housing of that breaker. As shown best in FIG. 7, each of the bus blades has a notch 64 formed therein for accommodating the tab when the breaker is mounted on the bus blade, as shown in FIG. 3. The tab 62 thus prevents the mounting of the circuit breaker onto a bus blade that does not have a matching notch, and thereby limits the total number of breakers that can be installed in the panelboard.

To permit more ready insertion or removal of a breaker having such a rejection tab, the housing of one of the mating breakers (here breaker 38) is provided with a second arcuate groove 66 (FIG. 5) which receives and allows the free movement of the rejection clip 62 of breaker 40, when breaker 40 is being removed from or installed onto the panelboard in a manner similar to the accommodation and movement of the bus clip of breaker 40 into the arcuate groove 54 of breaker 38 during such an operation.

Groove 66 has a first deep part 68 (FIG. 5a) communicating at its lower end with the upper end of the recessed zone 46, and an upper sloping, camming part 70 that terminates at the surface of the breaker housing at a location spaced from the upper end of the breaker housing. During the removal of a breaker having a rejection tab, that tab passes from the recessed zone of the other breaker in the pair in which it is received (FIG. 3), into the groove 66, and into the camming sloped portion 70. This passage of the tab through groove 66 of a mating breaker, which also occurs when the breaker is installed on the housing, further facilitates the removal or installation of the breaker.

It will be appreciated from the foregoing description of one embodiment of the invention that insertion and removal of a breaker from the panelboard are both significantly facilitated. It will also be appreciated that variations and modifications to the specifically disclosed embodiment may become apparent to those skilled in the art without necessarily departing from the spirit and scope of the invention.

What is claimed is:

1. A pair of mating circuit breakers for installation in a panelboard, each of said circuit breakers comprising a housing, a bus clip mounted within said housing for attachment to a bus blade and having a portion extending outwardly therefrom, a recessed zone formed in a lower corner of one side of each of said housings adjacent said bus clip said recessed zone in one circuit breaker being provided for accommodating said bus clip of said other mating circuit breaker when said pair of breakers are mounted alongside one another on a panelboard, and a groove formed in said one side of the said housing of each of said circuit breakers and having a lower portion leading to each said recessed zone and in substantial alignment with the portion of each said recessed zone that is adapted to accommodate said bus clip of the other of said mating breakers when both of said circuit breakers are mounted adjacent one another on the panel board, each said groove being effective to receive and to permit said bus clip of the other of said mating breakers to pass directly between said recessed zone and said groove when one of said mating circuit breakers is pivoted relative to the other circuit breaker when the latter is mounted on the panelboard.

2. The circuit breaker arrangement of claim 1, in which each said groove includes a first part opening to each said recessed zone and of substantially the same depth as said recessed zone, and a second part angularly offset from said first part and having a variable depth less than that of said first part.

3. The circuit breaker arrangement of claim 1, in which each said groove comprises a first part leading to each said recessed zone and at substantially the same depth as said recessed zone, a second part angularly offset from said first part and at a lesser depth than said first part, and a third part of varying depth intermediate and leading to said first and second parts.

4. The circuit arrangement of claims 1, 2 or 3, further comprising a second groove in each breaker housing leading to each said recessed zone and spaced from said first-mentioned groove for accommodating a rejection tab secured to the each circuit breaker.

5. The circuit breaker arrangement of claim 1, in which said bus clips of said pair of breakers are spaced inwardly at different distances within said respective housings so that said bus clips of said breakers are respectively accommodated within said recessed zones of the other of said breakers and are in a side-by-side relationship when said breakers are mounted adjacent one another on the panelboard.

* * * * *

UNITED STATES PATENT OFFICE
CERTIFICATE OF CORRECTION

Patent No. 4,181,924      Dated January 1, 1980

Inventor(s) Robert W. Thomas et al

It is certified that error appears in the above-identified patent and that said Letters Patent are hereby corrected as shown below:

Claim 4, column 6, line 66, after "from" insert -- each --;

line 68, delete "the".

Signed and Sealed this

Eighth Day of April 1980

[SEAL]

Attest:

SIDNEY A. DIAMOND

Attesting Officer      Commissioner of Patents and Trademarks